(12) United States Patent
Kao et al.

(10) Patent No.: US 6,281,320 B1
(45) Date of Patent: Aug. 28, 2001

(54) USE OF CHELATABLE PHENOLS WITH METALLOCENE- ALUMINOXANE CATALYST SYSTEMS

(75) Inventors: Sun-Chueh Kao; Frederick John Karol, both of Belle Mead, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/244,442

(22) Filed: Feb. 4, 1999

(51) Int. Cl.⁷ ..................................... C08F 10/00
(52) U.S. Cl. ................ 526/348; 526/160; 526/943; 526/313; 526/352; 502/152; 502/156
(58) Field of Search ..................... 526/160, 348, 526/352, 943, 313; 502/152, 156

(56) References Cited

U.S. PATENT DOCUMENTS 4,931,517   6/1990   Fujita .................................. 526/128

FOREIGN PATENT DOCUMENTS

| 0 630 910 A1 | 12/1994 | (EP) . |
| 0 630 910 | * 12/1994 | (EP) . |
| 4 323 207 | * 11/1992 | (JP) . |
| 7-160441 | 9/1996 | (JP) . |
| WO 93/13140 | 7/1993 | (WO) . |

* cited by examiner

*Primary Examiner*—David W. Wu
*Assistant Examiner*—Ling-Siu Choi

(57) ABSTRACT

This invention comprises a metallocene catalyst system for the production of high molecular weight polyolefins, particularly polyethylene and higher poly-alpha olefins, and copolymers of ethylene and/or alpha olefins with other unsaturated monomers, including diolefins, acetylenically unsaturated monomers and cyclic olefins. The catalyst system is highly active, at low ratios of Al to transition metal, and hence catalyzes the production of a polyolefin product containing low levels of catalyst metal residues. The catalyst system comprises (i) a metallocene precursor (Component A), aluminoxane (Component B), and phenolic modifier (Component C) or (ii) the reaction product of a metallocene precursor with a phenolic compound (Component A') and aluminoxane (Component B). There is also provide a polymerization process using the catalyst and the product so produced.

7 Claims, No Drawings

USE OF CHELATABLE PHENOLS WITH METALLOCENE- ALUMINOXANE CATALYST SYSTEMS

FIELD OF THE INVENTION

This invention relates to catalyst systems, both supported and unsupported, and to a process using such catalyst systems for the production of high molecular weight polymers, particularly polyolefins.

BACKGROUND OF THE INVENTION

One major drawback of highly active simple zirconocene dihalide systems such as bis(n-butylcyclopentadienyl) zirconium dichloride for ethylene copolymerization has been the premature chain termination through beta-hydride elimination of the inserted alpha-olefin. As a result, high molecular weight ethylene-alpha olefin copolymers can not be produced by this group of catalysts under commercial operation conditions.

A typical solution for this deficiency has been the replacement of simple cyclopentadienyl groups with structurally more elaborate ligands. The synthesis of such ligands are, in general, time-consuming and laborious; and the resulting catalysts are, very often, less active.

U.S. Pat. No. 4,931,517 assigned to Mitsubishi Petrochemical discloses the use of silicon compounds having an Si—O—C bond as a molecular weight regulator for polyethylene produced using by the combination of certain metallocene and an aluminoxane. However, to be effective in boosting the molecular weight, a Si/Zr ratio of 40 or higher was employed. But with these Si/Zr ratios, the metallocene catalysts employed suffered greater than 50% loss in catalyst activity.

WO 93/13140 assigned to Exxon discloses the use of a phenol component of a catalyst system along with a monocyclopentadienyl Group IVB transition metal compound and aluminoxane. However, the ethylene polymers produced by this catalyst system displayed lower molecular weight.

Indemitsu Kosan's Japanese Application No. H7-160441 (Disclosure No. H8-231622) discloses a catalyst containing a monocyclopentadienyl compound, aluminoxane, and a phenolic compound. However, the phenolic compounds employed are not capable of forming chelatable groups on the 2 and 6 positions, since it is known to lead to deactivation or to show no catalytic activity with a monocyclopentadienyl compound. In this catalyst, the 2,6-substituent is an alkyl group.

EP 0 630 910 assigned to Union Carbide discloses a method for reversibly controlling the activity of an olefin polymerization catalyst by the addition of a Lewis base containing an available pair of electrons capable of forming a dative bond to both the metallocene and the aluminoxane. Here Lewis bases are employed for activity reduction and/or to control static.

It would be desirable to develop some simple modifications that would enable a simple zirconocene system to produce ethylene copolymers with high molecular weights and to maintain high catalytic activity.

SUMMARY OF THE INVENTION

The present invention has solved the above-described problem by (1) replacing the halide ligands, e.g., chloride, of zirconocene dihalides with certain chelatable phenols or (2) by using these phenols as external modifiers for the ziroconcene dihalides. The use of chelatable phenolic groups at the 2 and 6 positions of the catalyst component can increase the molecular weight of the final polymer without a change or reduction in catalyst activity. This obviates the requirement for expensive and laborious ligand synthesis.

Accordingly, there is provided a catalyst system comprising:

Component A having the structure $(CpRn)R^1(1-y)$ $(CpRm)MX_2$ wherein M is a metal selected from the group consisting of Ti, Zr, and Hf; each (CpRn) and (CpRm) is independently a cyclopentadienyl or substituted cyclopentadienyl group bonded to M; each R is independently selected from the group consisting an alkyl, a cycloalkyl, an alkenyl, a cycloalkenyl, an aryl, an alkylaryl, or an arylalkyl, each member of this group containing from 1 to 20 carbon atoms; and optionally at least two R moieties are joined together to from a ring having 4 to 6 carbon atoms; $R^1$ is selected from the group consisting of (i) a $C_1$–$C_4$ substituted or unsubstituted alkenyl radical, (ii) a dialkyl or diaryl of germanium or silicon, (iii) an alkyl or aryl phosphine, and (iv) an amino group bridging two (CpRn) and (CpRm) rings; and each X is independently selected from the group consisting of (i) hydrogen, (ii) a $C_1$–$C_{20}$ alkyl, (iii) a $C_1$–$C_{20}$ aryl, (iv) a $C_1$–$C_{20}$ alkenyl, (v) a $C_1$–$C_{20}$ alkylaryl, (vi) a $C_1$–$C_{20}$ arylalkyl (vii) a $C_1$–$C_{20}$ hydrocarboxy, (viii) a $C_1$–$C_{20}$ aminoalkyl, and (ix) a halogen; n and m are each 0,1, 2, 3, 4, or 5; and y is 0, or 1;

Component B an aluminoxane; and

Component C a phenol having the formula:

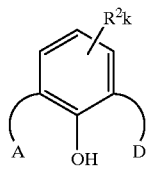

wherein A and D are the same or different and are selected from the group consisting of: —OR', —NR'$_2$, —PR'$_2$, —CR'$_2$OR', —CR'$_2$NR'$_2$, —COR', —CR'NR', —COOR', —CONR'$_2$, —OCOR'—NR'COR', and wherein each R' is the same or different and are independently selected from the group consisting of alkyl, cycloalkyl, alkenyl, cycloalkenyl, aryl, alkylaryl, and arylalkyl radical, each R' containing from 1 to 20 carbon atoms; each $R^2$ is independently selected from the group consisting an alkyl, a cycloalkyl, an alkenyl, a cycloalkenyl, an aryl, an alkylaryl, or an arylalkyl, each member of this group containing from 1 to 20 carbon atoms; and optionally at least two $R^2$ moieties are joined together to from a ring having 4 to 6 carbon atoms; k is 0, 1, 2, 3.

There is also provided a catalyst system comprising:

Component A' having the formula: $(CpRn)R^1(1-y)(CpRm)MY_2$ wherein M, (CpRn), (CpRm), R, $R^1$ are as set forth above; and each Y is independently a phenoxide radical having the formula:

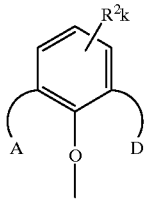

wherein A, D, R', $R^2$, m, n, k and y are as set forth above; and

Component B an aluminoxane. By "chelatable" is meant that the A and D groups on C and A', respectively, have functional components that can attach by coordinate links, either intermolecularly (Component C) or intramolecularly (Component A') to the transition metal atoms based catalyst center in such a way to form chelate rings.

There are further provided a polymerization process using these catalysts and the polyolefin so produced. The use of at least one of these catalysts provide a polymerization (e.g., gas phase fluidized process) whereby the final polymer produced has increased molecular weight as compared to polymerizing in the absence of the phenolic substituent and does so without a loss or reduction in catalyst activity during the polymerization.

DETAILED DESCRIPTION OF THE INVENTION

Catalyst System. The present invention provides a catalyst system comprising a combination of Components A, B, and C or a combination of Components A' and B in which Component A' is the reaction product of Components A and C. Optionally one or more of these components can be deposited on a support material using techniques known to those skilled in the catalyst art. Alternatively, one or more components of the catalyst system may be spray dried with or without a filler using techniques known to those skilled in the catalyst art (for example, see U.S. Pat. No. 5,672,669).

At all times, the individual catalyst system components, as well as the catalyst system once formed, need to be protected from oxygen and moisture since these are known poisons for the catalysts. Therefore, the reactions to prepare the catalyst system are performed in an oxygen and moisture free atmosphere and, where the catalyst system is recovered separately, it is recovered in an oxygen and moisture free atmosphere. Preferably, therefore, the reactions are performed in the presence of an inert dry gas such as, for example, nitrogen, argon, helium, a $C_2$ to $C_8$ alkane, or mixtures of these.

Component A. In the catalyst system of the invention Component A has the formula:

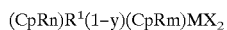

$(CpRn)R^1(1-y)(CpRm)MX_2$ where M is a metal selected from the group consisting of Ti, Zr, and Hf; each (CpRn) and (CpRm) is independently a cyclopentadienyl or substituted cyclopentadienyl group bonded to M; each R is independently selected from the group consisting of an alkyl, a cycloalkyl, an alkenyl, a cycloalkenyl, an aryl, an alkylaryl, and an arylalkyl, each member of this group containing from 1 to 20 carbon atoms, optionally two R moieties are joined together to from a $C_4-C_6$ ring; $R^1$ is selected from the group consisting of (i) a $C_1-C_4$ substituted or unsubstituted alkenyl radical, (ii) a dialkyl or diaryl of germanium or silicon, (iii) an alkyl or aryl phosphine, and (iv) an amino group bridging two (CpRn) and (CpRm) rings; and each X is independently selected from the group consisting of (i) hydrogen, (ii) a $C_1-C_{20}$ alkyl, (iii) a $C_1-C_{20}$ aryl, (iv) a $C_1-C_{20}$ alkenyl, (v) a $C_1-C_{20}$ alkylaryl, (vi) a $C_1-C_{20}$ arylalkyl (vii) a $C_1-C_{20}$ hydrocarboxy, (viii) a $C_1-C_{20}$ aminoalkyl, and (ix) a halogen; n and m are each 0, 1, 2, 3, 4, or 5; and y is 0 or 1.

Examples of useful non-bridged metallocenes for Component A include zirconocenes such as bis(cyclopentadienyl)-zirconium dichloride; bis(n-butylcyclopentadienyl)zirconium dichloride; bis(n-propylcyclopentadienyl)zirconium dichloride; bis (cyclopentadienyl)zirconium diphenoxide; bis(cyclopentadienyl)zirconium dibenzoate; bis(n-butylcyclopentadienyl)-zirconium diphenoxide; bis(n-butylcyclopentadienyl) zirconium dibenzoate; bis(methylcyclopentadienyl) zirconium dichloride; bis(methylcyclopentadienyl) zirconium dimethyl; bis(1,3-methyl-n-butylcyclopentadienyl)zirconium dichloride; bis(1,3-methyl-n-propylcyclopentadienyl)zirconium dichloride; (cyclopentadienyl)(9-fluorenyl)zirconium dichloride; bis(1-indenyl)zirconium dichloride; bis(4,5,6,7-H-tetrahydroindenyl)zirconium dichloride; titanocenes such as bis(cyclopentadienyl)titanium dichloride; bis(n-butyl cyclopentadienyl)titanium dichloride; bis (cyclopentadienyl)-titanium diphenoxide; bis (cyclopentadienyl)titanium dibenzoate; bis(n-butylcyclopentadienyl)zirconium diphenoxide; bis(n-butylcyclopentadienyl)zirconium dibenzoate; bis(methyl cyclopentadienyl)titanium dichloride; bis (methylcyclopenta-dienyl)titanium dimethyl; bis (cyclopentadienyl)titanium dichloride; (cyclopentadienyl) (9-fluorenyl)titanium dichloride; bis( 1-indenyl)titanium dichloride; bis(4,5,6,7-H-tetrahydro-indenyl)titanium dichloride; and hafnocenes such as bis(cyclopentadienyl) hafnium dichloride; bis(n-butylcyclopenta-dienyl)hafnium dichloride; bis(cyclopentadienyl)hafnium diphenoxide; bis (cyclopentadienyl)hafnium dibenzoate; bis(n-butylcyclopentadienyl)zirconium diphenoxide; bis(n-butylcyclo pentadienyl)zirconium dibenzoate; bis(n-propylcyclopentadienyl)-zirconium dichloride bis (methylcyclopentadienyl)hafnium dichloride; bis (methylcyclopentadienyl)hafnium dimethyl; bis (cyclopentadienyl)hafnium dichloride; (cyclopentadienyl) (9-fluorenyl)hafnium dichloride; bis(1-indenyl)hafnium dichloride; bis(4,5,6,7-H-tetrahydroindenyl)hafnium dichloride.

These metallocene compounds may be obtained by any conventional means. Their methods of preparation have been disclosed in several review articles and references. For example, see J. Birmingham, *Adv. Organomet. Chem.* 2, 365 (1994). D. W. Macomber, W. P. Hart, M. D. Rausch, Adv. Organomet. Chem. 21, 1 (1972), and "Metallocenes-Synthesis, Reactivity, Applications," A. Togni and R. L. Halerman, (eds.), WILEY-VCH, Weinheim, FRG (1998). A large number of these metallocenes are also commercially available from sources such as Boulder Scientific Company.

Examples of useful bridged zirconocene compounds for Component A include dimethylsilyl bis(cyclopentadienyl) zirconium dichloride; dimethylsilyl bis(3-n- propylcyclopenta-dienyl) zirconium dichloride; diphenylmethylene (cyclopentadienyl-9-fluorenyl) zirconium dichloride; isopropylidene(cyclopentadienyl)(fluorenyl)zirconium dichloride; isopropylidene(cyclopentadienyl)(octahydrofluorenyl)zirconium dichloride; diisopropylmethylene (cyclopentadienyl)-(fluorenyl)zirconium dichloride; cyclohexylidene (cyclopentadienyl)(fluorenyl) zirconium dichloride; diisopropylmethylene (2,5-dimethylcyclopentadienyl)-(fluorenyl)zirconium dichloride; rac-ethylenebis(indenyl)zirconium dichloride; rac-ethylenebis(4,5,6,7-H-tetrahydroindenyl)zirconium dichloride; rac-dimethylsilylenebis(indenyl)zirconium dichloride; rac-dimethylsilylene bis(4,5,6,7-H-tetrahydroindenyl) zirconium dichloride; rac-1,1,2,2-tetramethylsilanylene bis (1-indenyl)zirconium dichloride; rac-1,1,2,2-tetramethylsilanylene bis(4,5,6,7-H-tetrahydro-1-indenyl) zirconium dichloride; ethylidene (1-indenyl)(tetramethylcyclopentadienyl) zirconium dichloride; rac-dimethylsilylene bis(2-methyl-4-t-butyl-1-cyclopentadienyl) zirconium dichloride; rac-ethylenebis (indenyl)zirconium dimethyl; rac-ethylenebis(4,5,6,7-H-tetrahydroindenyl)zirconium dimethyl; rac-dimethylsilylenebis(indenyl)zirconium dimethyl; rac-dimethylsilylenebis(4,5,6,7-H-tetrahydroindenyl)zirconium dimethyl; isopropylidene(cyclopentadienyl)(fluorenyl) zirconium dimethyl; diphenylmethylene(cyclopentadienyl)-(fluorenyl)zirconium dimethyl; rac-ethylenebis(2-methylindenyl)zirconium dichloride; rac-dimethylsilylenebis(2-methylindenyl)zirconium dichloride; rac-ethylenebis(2-methylindenyl)zirconium dimethyl, and rac-dimethylsilylenebis(2-methylindenyl)zirconium dimethyl. Bridged titanocene and hafnocene compounds for Component A can also be employed. Illustrative examples include the above-enumerated compounds in which titanium or hafnium have been substituted for zirconium.

The bridged metallocene catalyst may be made by one of several methods. For example, see A. Razavi and J. Ferrara, *J. Organomet. Chem.*, 435, 299 (1992) and K. P. Reddy and J. L. Petersen, *Organometallics*, 8, 2107 (1989). One method comprises first reacting two equivalents of an optionally substituted cyclopentadiene with a metallic deprotonating agent such as an alkyllithium or potassium hydride in an organic solvent such as tetrahydrofuran. This is followed by reaction of this solution with a solution of one equivalent of a doubly-halogenated compound such as dichlorodimethylsilane. The resulting ligand is isolated by conventional methods known to those skilled in the art (such as distillation or liquid chromatography), reacted with two equivalents of a metallic deprotonating agent as above, and reacted with one equivalent of a tetrachloride of a Group IV(B) metal, optionally coordinated with donor ligand molecules such as tetrahydrofuran, in organic solvent. The resulting bridged metallocene catalyst is isolated by methods known to those skilled in the art such as recrystallization or sublimation.

Alternatively, the bridged metallocene catalyst may be produced by first reacting one equivalent of an optionally substituted cyclopentadiene with one equivalent of metallic deprotonating agent in an organic solvent as above, followed by reaction with one equivalent of a molecule containing an unsaturated five-carbon ring to which is attached an exocyclic group susceptible to nucleophilic attack, such as a dialkylfulvene. The reactive solution is quenched with water and the ligand is isolated by conventional methods. One equivalent of the ligand is reacted with two equivalents of metallic deprotonating agent as above and the resulting solution is in turn reacted with one equivalent of a tetrachloride of a Group IV(B) metal optionally coordinated with donor ligand molecules such as tetrahydrofuran, in organic solvent. The resulting bridged metallocene catalyst is isolated by methods known to those skilled in the art.

Preferably, the metallocene is selected from the group consisting of bis(cyclopentadienyl)zirconium dichloride, bis (n-butylcyclopentadienyl)zirconium dichloride, bis(n-propyl-cyclopentadienyl)zirconium dichloride, bis (methylcyclopenta-dienyl)zirconium dichloride, bis(1-indenyl)zirconium dichloride, bis(1,3-methyl-n-butylcyclopentadienyl)zirconium dichloride, bis(1,3-methyl-n-propylcyclopentadienyl)zirconium dichloride, dimethylsilyl bis(cyclopentadienyl)zirconium dichloride, dimethylsilyl bis(3-n-propylcyclopentadienyl)zirconium dichloride, rac-ethylenebis(indenyl)zirconium dichloride, and rac-ethylenebis(4,5,6,7-H-tetrahydroindenyl)zirconium dichloride.

Component B. An aluminoxane (which can interchangeably be called "alumoxane") is used as Component B and serves as the cocatalyst.

Preferably, the cocatalyst is a branched or cyclic oligomeric poly(hydrocarbylaluminum oxide). More preferably, the cocatalyst is an aluminoxane such as methylaluminoxane (MAO) or modified methylaluminoxane (MMAO).

Aluminoxanes are well known in the art and comprise oligomeric linear alkyl aluminoxanes represented by the formula:

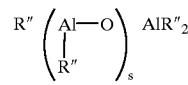

and oligomeric cyclic alkyl aluminoxanes of the formula:

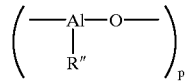

wherein s is 1–40, preferably 10–20; p is 3–40, preferably 3–20; and R" is an alkyl group containing 1 to 12 carbon atoms, preferably methyl or an aryl radical such as a substituted or unsubstituted phenyl or naphthyl radical.

Aluminoxanes are readily commercially available and may be prepared in a variety of ways known to those skilled in the art. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyldialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, may be synthesized by the reaction of a polyalkyl aluminoxane containing $C_2$ or higher alkyl groups with trimethylaluminum and then with water as disclosed in, for example, U.S. Pat. No. 5,041,584.

Preferably, the activating cocatalyst is a branched, cyclic, or caged oligomeric poly(hydrocarbylaluminum oxide). By caged is meant two cyclic structures joined together. More preferably, the activating cocatalyst is an aluminoxane such as methylaluminoxane (MAO) or modified methylaluminoxane (MMAO).

Component C. A phenol compound having the formula:

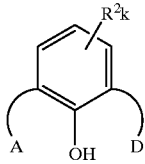

wherein A and D are the same or different and are selected from the group consisting of —OR', —NR'$_2$, —PR'$_2$, —CR'$_2$OR', —CR'$_2$NR'$_2$, —COR', —CR'NR', —COOR', —CONR'$_2$, —OCOR'—NR'COR', and wherein each R' can be the same or different and is independently selected from the group consisting of alkyl, cycloalkyl, alkenyl, cycloalkenyl, aryl, alkylaryl, or arylalkyl, in which each of these radicals contains from 1 to 20 carbon atoms, each R$^2$ is independently selected from the group consisting an alkyl, a cycloalkyl, an alkenyl, a cycloalkenyl, an aryl, an alkylaryl, or an arylalkyl, each member of this group containing from 1 to 20 carbon atoms; and optionally at least two R$^2$ moieties are joined together to from a ring having 4 to 6 carbon atoms; k is 0, 1, 2, 3, can be employed as Component C.

Preferably the phenolic component is selected from the group consisting of 2,6-dimethoxyphenol, 2,6-diethoxyphenol, 2,6-di(n-propoxy)phenol, 2,6-di(isopropoxy)phenol, 2,6-di(n-butoxy)phenol, 2,6-di(t-butoxy)phenol, 2,6-diaminophenol, 2,6-diacetylphenol, 2,6-diformylphenol, 2,6-di(methylimino)phenol, 2,6-di(phenylimino)phenol, 2,6-di(methoxymethyl)phenols, 2,6-di(ethoxymethyl)phenols, 2,6-di(methylcarboxylate)phenol, 2,6-methoxy(acetyl)phenol, 2,6-methoxy(formyl)phenol, and 2,6-ethoxy(formyl)phenol. A number of these phenolic compounds are commercially available from Aldrich Chemical Company.

An advantage of employing this three component system (Components A, B, and C) over the two component system described below is that, in addition to continuous addition, Component C can be added periodically or intermittently to a polymerization to control the molecular weight of the polymer or to vary its molecular weight over time. That is, this three component system affords some versatility not found using the two component system described below.

Component A'. This component is the reaction product of Components A and C each of which are as described previously. Component A' has the formula:

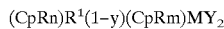

(CpRn)R$^1$(1–y)(CpRm)MY$_2$ where M is selected from the group consisting of Ti, Zr, and Hf; each (CpRn) and (CpRm) is independently a cyclopentadienyl or substituted cyclopentadienyl group bonded to M; each R is independently alkyl, cycloalkyl, alkenyl, cycloalkenyl, aryl, alkylaryl, or arylalkyl radical containing from 1 to 20 carbon atoms, or optionally two R moieties are joined together to from a C$_4$–C$_6$ ring; R$^1$ is a C$_1$–C$_4$ substituted or unsubstituted alkenyl radical, a dialkyl or diaryl germanium or silicon, or an alkyl or aryl phosphine or amine radical bridging two (CpRn) and (CpRm) rings; each Y is independently a phenoxide radical having the formula:

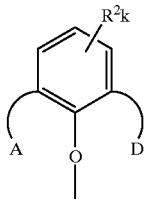

wherein A and D are the same or different and are selected from the group consisting of —OR', —NR'$_2$, —PR'$_2$, —CR'$_{2O}$OR', —CR'$_2$NR'$_2$, —COR', —CR'NR', —COOR', —CONR'$_2$, —OCOR —NR'COR', and wherein each R' can be the same or different and is independently selected from the group consisting of alkyl, cycloalkyl, alkenyl, cycloalkenyl, aryl, alkylaryl, or arylalkyl radical containing from 1 to 20 carbon atoms; each R$^2$ is independently selected from the group consisting an alkyl, a cycloalkyl, an alkenyl, a cycloalkenyl, an aryl, an alkylaryl, or an arylalkyl, each member of this group containing from 1 to 20 carbon atoms; and optionally at least two R$^2$ moieties are joined together to from a ring having 4 to 6 carbon atoms; n and m are each 0, 1, 2, 3, 4, or 5; k is 0, 1, 2, 3; y is 0, or 1.

Component A' was obtained by the procedure reported by Chi-Tain Chen and Han-Mou Gau, in *J. Organomet. Chem.*, 505, 17 (1995). However, the procedure was modified by using toluene instead of benzene as the solvent and the product was isolated by filtration instead of extracting with n-pentane.

Examples of useful metallocene diphenoxide compounds for Component A' include zirconocenes such as bis(cyclopentadienyl)zirconium di(2,6-dimethoxyphenoxide); bis(n-butylcyclopentadienyl)zirconium di(2,6-dimethoxyphenoxide); bis(n-propylcyclopentadienyl)zirconium di(2,6-dimethoxyphenoxide); bis(n-butylcyclopentadienyl)zirconium di(2,6-diethoxyphenoxide); bis(n-butylcyclopentadienyl)zirconium di(2,6-di-n-propoxyphenoxide); bis(n-butylcyclopentadienyl)zirconium di(2,6-diisopropoxyphenoxide);); bis(n-butylcyclopentadienyl)zirconium di(2,6-di-n-butoxyphenoxide); bis(n-butylcyclopentadienyl)zirconium di(2,6-di-t-butoxyphenoxide); bis(methylcyclopentadienyl)zirconium di(2,6-dimethoxyphenoxide); bis(1,3-methyl-n-butylcyclopentadienyl)zirconium di(2,6-dimethoxyphenoxide); bis(1,3-methyl-n-propylcyclopentadienyl)zirconium di(2,6-dimethoxyphenoxide); (cyclopentadienyl)(9-fluorenyl)zirconium di(2,6-dimethoxyphenoxide); bis(1-indenyl)zirconium di(2,6-dimethoxyphenoxide); bis(4,5,6,7-H-tetrahydroindenyl)zirconium di(2,6-dimethoxyphenoxide); titanocenes such as bis(cyclopentadienyl)titanium di(2,6-dimethoxyphenoxide)dichloride; bis(n-butylcyclopentadienyl)titanium di(2,6-dimethoxyphenoxide); bis(1-indenyl)titanium di(2,6-dimethoxyphenoxide); bis(4,5,6,7-H-tetrahydroindenyl)titanium di(2,6-dimethoxyphenoxide); and hafnocenes such as bis(cyclopentadienyl)hafnium di(2,6-dimethoxyphenoxide); bis(n-butylcyclopentadienyl)hafnium di(2,6-dimethoxyphenoxide); fluorenyl)hafnium dichloride; bis(1-indenyl)hafnium di(2,6-dimethoxyphenoxide); bis(4,5,6,7-H-tetrahydroindenyl)hafnium di(2,6-dimethoxyphenoxide).

Examples of useful bridged zirconocene compounds for Component A' include dimethylsilyl bis(cyclopentadienyl) zirconium di(2,6-dimethoxyphenoxide); dimethylsilyl bis (3-n-propylcyclopentadienyl)zirconium di(2,6-dimethoxyphenoxide); diphenylmethylene (cyclopentadienyl-9-fluorenyl)zirconium di(2,6-dimethoxyphenoxide); isopropylidene(cyclopentadienyl)- (fluorenyl)zirconium di(2,6-dimethoxyphenoxide); isopropylidene(cyclopentadienyl) (octahydrofluorenyl) zirconium di(2,6-dimethoxyphenoxide); diisopropylmethylene (cyclopentadienyl)(fluorenyl)zirconium di(2,6-dimethoxy-phenoxide); diisobutylmethylene- (cyclopentadienyl)(fluorenyl)zirconium di(2,6-dimethoxyphenoxide); ditertbutylmethylene (cyclopentadienyl)(fluorenyl)zirconium di(2,6-dimethoxyphenoxide); cyclohexylidene(cyclopentadienyl)(fluorenyl) zirconium di(2,6-dimethoxyphenoxide); diisopropylmethylene (2,5-dimethylcyclopentadienyl)(fluorenyl)zirconium di(2,6-dimethoxyphenoxide); rac-ethylenebis(indenyl) zirconium di(2,6-dimethoxyphenoxide); rac-ethylenebis(4, 5,6,7-H-tetrahydro-indenyl)zirconium di(2,6-dimethoxyphenoxide); rac-dimethylsilylenebis(indenyl) zirconium di(2,6-dimethoxy-phenoxide); rac-dimethylsilylenebis(4,5,6,7-H-tetrahydro-indenyl) zirconium di(2,6-dimethoxyphenoxide); rac-1,1,2,2-tetramethylsilanylene bis (1-indenyl)zirconium di(2,6-dimethoxyphenoxide); rac-1,1,2,2-tetramethylsilanylene bis (4,5,6,7-H-tetrahydro-1-indenyl)zirconium di(2,6-dimethoxyphenoxide); ethylidene (1-indenyl) (tetramethylcyclo pentadienyl)zirconium di(2,6-dimethoxyphenoxide); rac-dimethylsilylene bis (2-methyl-4-t-butyl-1-cyclopentadienyl)zirconium di(2,6-dimethoxyphenoxide); rac-ethylenebis(2-methylindenyl) zirconium di(2,6-dimethoxyphenoxide); rac-dimethylsilylenebis (2-methylindenyl)zirconium di(2,6-dimethoxyphenoxide). Bridged titanocene and hafnocene compounds for Component A' can also be employed. Illustrative examples include the above-enumerated compounds in which titanium or hafnium have been substituted for zirconium.

Preferably, the metallocene diphenoxides are selected from the group consisting of bis(cyclopentadienyl) zirconium di(2,6-methoxyphenoxide), bis(n-butylcyclopentadienyl)zirconium di(2,6-methoxyphenoxide), bis(1-indenyl)zirconium di(2,6-methoxyphenoxide), bis(1,3-methyl-n-butylcyclopentadienyl)zirconium di(2,6-methoxyphenoxide), bis(1,3-methyl-n-propylcyclopentadienyl)zirconium di(2,6-methoxyphenoxide), dimethylsilyl bis(cyclopentadienyl) zirconium di(2,6-dimethoxyphenoxide), dimethylsilyl bis(3-n-propyl-cyclopentadienyl)zirconium di(2,6-dimethoxyphenoxide), rac-ethylenebis(indenyl)zirconium di(2,6-dimethoxyphenoxide), rac-ethylenebis (4,5,6,7-H-tetrahydroindenyl)zirconium di(2,6-dimethoxyphenoxide).

Ratio of Components A, B, and C. The amounts of metallocene catalyst (Component A), the activating aluminoxane cocatalyst (Component B), and phenol modifier (Component C) usually employed in the catalyst composition may vary over a wide range. In any event, the aluminoxane cocatalyst and the metallocene are employed to such amounts as to provide a molar ratio of the aluminum atoms in the aluminoxane to the metal atom in the metallocene catalyst from about 2:1 to about 100,000:1, preferably from about 10:1 to about 10,000:1, and most preferably from about 50:1 to about 2,000:1. The aluminoxane cocatalyst and phenol compound are employed to such amount as to maintain the molar ratio of aluminum atom in the cocatalyst to the OH contained in the phenol from about 2:1 to about 100,000:1, preferably from about 10:1 to about 5,000:1, and most preferably from about 25:1 to about 1,000:1.

Ratio of Components A' and B. The amounts of metallocene catalyst (Component A') and the activating aluminoxane cocatalyst (Component B) usually employed in the catalyst composition may also vary over a wide range. In any event, the aluminoxane cocatalyst and the metallocene are employed to such amounts as to provide a molar ratio of the aluminum atoms in the aluminoxane to the metal atom in the metallocene catalyst from about 2:1 to about 100, 000:1, preferably from about 10:1 to about 10,000:1:, and most preferably from about 50:1 to about 2,000:1.

Preparation of catalyst system comprising Components A, B, and C. The metallocene (Component A), aluminoxane (Component B), and phenol compound (Component C) can be introduced into the polymerization reactor separately or two or more of the components may be partially or completely mixed with each other before they are introduced into the reactor. The latter mode of feeding (completely mixing all of the components) is more preferred, since it ensures a more homogeneous mixing of the catalyst components.

Preparation of catalyst system comprising Components A' and B. The metallocene-phenoxide component (Component A') and aluminoxane (Component B) can be introduced into the polymerization reactor separately or these two components may be mixed with each other before they are being introduced into the reactor. The latter mode (mixing the two components prior to feeding) is more preferred, since it ensures a more homogeneous mixing of the catalyst components.

Support Material. It is preferred to employ the catalyst in unsupported form. However, if desired, the catalyst may also be prepared in a supported form. Normally the A or A' component and the aluminoxane component (Component B) are prepared as a supported catalyst by deposition on a support material. Component C when employed with Components A and B may also be, and preferably is deposited on a support or used in conjunction with supported Components A and/or B by addition of the modifier such as 2,6-dimethoxyphenol to a diluent such as toluene to which the supported component is ultimately added.

The support material for preparing the supported catalyst may be any resinous support material such as a polyolefin or finely divided inorganic solid porous support, such as talc, silica, alumina, silica-alumina, carbon black, activated carbon, or a mixture thereof. Other inorganic oxides that may be employed either alone or in combination with silica or silica-alumina are magnesia, titania, zirconia, and the like. The inorganic oxides may be dehydrated, as is well known in the art, to remove water. If desired, the residual surface hydroxyl groups in the inorganic solid porous support may be removed by additional heating or by reaction with chemical dehydrating agents such as lithium alkyl, silylchloride, aluminum alkyls, or preferably aluminoxane. Preferred catalyst supports include dehydrated inorganic oxide treated with an alumoxane, more preferably with methyaluminoxane. A suitable support material of this type is a dehydrated silica gel treated with methylaluminoxane. When such a aluminoxane-treated support is utilized in the production of the supported catalyst, it may not be necessary to include additional aluminoxane in the catalyst composition. Also preferred as a catalyst support is a wet gel, more preferably a wet silica gel, containing up to approximate 20% by weight absorbed water. Wet gels may be directly mixed with trialkylaluminums to for the aluminoxane component of the catalyst system directly on the support.

Generally, the amount of support material used is that which provides about 0.003 to about 0.6 millimole of transition metal (from Component A or A'), 0.2 to 10 millimole of aluminum (from Component B), and, optionally, 0.006 to about 1.2 millimole of phenol modifier (from Component C) per gram of support material and preferably about 0.01 to about 0.4 millimole of transition metal, 1.0 to about 8 millimole of aluminum, and, optionally, 0.02 to about 0.8 millimole of phenol modifier per gram of support material.

A suitable inorganic support such as silica would have a particle diameter in the range of 0.1–600 microns, preferably 0.3–100 microns; a surface area of 50–1000 m$^2$/g, preferably 100–500 m$^2$/g; and a pore volume of 0.5–3.5 cm3/g. To insure its use in dehydrated form, the support material may be heat treated at 100–1000 degrees C for a period of 1–100 hours, preferably 3–24 hours. The treatment may be carried out in a vacuum or while purging with a dry inert gas such as nitrogen. As an alternative, the support material may be chemically dehydrated. The chemical dehydration is accomplished by combining the support in an inert low boiling solvent such as, for example, heptane, in the presence of the dehydrating agent such as, for example, triethylaluminum in a moisture and oxygen-free atmosphere thereby forming a slurry.

Method of Use. The catalyst of the present invention can be used in liquid, solution, slurry, high pressure fluid (e.g., Japanese Patent Laid-Open Publication No. 56(1981)-18607), bulk, or gas phase polymerization processes, all of which are known to those skilled in the art. These processes can be employed singularly or in series in the production of polyolefins. According to the present invention, the polymerization can be carried out in batchwise fashion, but is generally performed in a continuous manner. Thus, polymerizations using the invention catalyst system may be conducted by any of these processes at a temperature in the range of about −100 degrees C. to about 300 degrees C. or higher under atmospheric, subatmospheric, or superatmospheric pressure conditions.

When a liquid reaction medium, such as those described in U.S. Pat. Nos. 3,324,095 and 4,931,517, is employed, as in solution, slurry, and bulk polymerizations, the reaction medium is the liquid monomer and/or an inert liquid hydrocarbon which is non-reactive under the polymerization conditions employed. While the hydrocarbon selected need not function as solvent for the catalyst or polymers obtained by the process, it usually serves as a solvent for the monomers employed in the polymerization. Among the inert hydrocarbon liquids suitable for this purpose can aromatic or aliphatic hydrocarbons and include isopentane, hexane, cyclohexane, heptane, n-dodecane, benzene, toluene, xylene, and the like.

Preferably, the catalyst is employed in a gas phase polymerization process employing one or more reactors, preferably connected in series. Gas phase reactions for the production of olefin polymers are typically carried out by fluidized bed, stirred or paddle-type reaction systems such as those described in, for example, U.S. Pat. Nos. 3,256,263; 3,625,932; 4,588,790; 4,994,534; 5,317,036; 5,453,471 and British Patent Nos. 1,248,951; 1,248,952, and 1,248,953. A gas fluidized bed process is preferred.

Such gas phase polymerization processes are operated at pressures up to about 1000 psi (6894 kPa) and is preferably operated at a pressure of about 150 to 350 psi (1034 to 2413 kPa), with operation at higher pressures in such ranges favoring heat transfer since an increase in pressure increases the unit volume heat capacity of the gas. These gas phase polymerization processes are carried out at temperatures in the range of about 20 degrees C. to about 120 degrees C., preferably 30 to 110 degrees C.

When hydrogen is used as a chain transfer agent in the processes, it is used in amounts varying between about 0.001 to about 10 moles of hydrogen per mole of alpha olefin monomer. Also as desired for temperature control of the system, any gas inert to the catalyst composition and monomers can be employed for temperature control.

As used herein, a "polyolefin" is meant to include homopolymers, copolymers, and terpolymers of alpha olefins and may optionally contain dienes, aromatic compounds with vinyl unsaturation and/or carbon monoxide. Generally, the alpha olefin monomers have from 2 to 12 carbon atoms and typically include, but are not limited to, ethylene, propylene, butene-1, pentene-1, 4-methyl-1-pentene, hexene-1, and octene-1.

Preferred dienes which may be polymerized alone or optionally polymerized with one or more alpha olefin monomers are those which are conjugated or non-conjugated. Preferably such dienes are non-conjugated. These non-conjugated dienes may be straight chain, branched chain, or cyclic hydrocarbon dienes having from about 5 to about 15 carbon atoms. Dienes which are especially preferred include 1,4-hexadiene, 1,5-hexadiene, 1,7-octadiene, 1,9-decadiene and 1,6-octadiene, 5-methyl-1,4-hexadiene, methyl-octadiene, 2,7-dimethyl-1,6-octadiene, 3,7-demethyl-1,7-octadiene, 1,3-cyclopentadiene, 1,4-cyclohexadiene, 1,5-cyclooctadiene, 1, 5-cyclododecadiene, tetra hydroindene, methyl tetrahydroindene, dicyclopentadiene, bicyclo -(2,2,1)-hepta-2,5-diene, 5-methylene-2-norbornene, 5-propeny 2-norbornene, 5-isopropylidene-2-norbornene, 5-(4-cyclepentenyl)-2-norbornene, 5-cyclohexylidene-2-norbornene, 5-vinyl-2-norbornene, and norbornadiene. Dienes that can be polymerized with or without an alpha olefin include 1,3-butadiene, 1,4-butadiene, and isoprene.

Preferred aromatic compounds having vinyl unsaturation which also may be polymerized alone or optionally polymerized with alpha olefin monomer(s) include styrene and substituted styrene.

These polyolefin polymerizations can also be conducted in the presence of an inert particulate material (carbon black, silica, talc, clay, activated carbon etc.) as disclosed in U.S. Pat. No. 4,994,534 to Rhee et al. When so employed, the inert particulate material is present in an amount ranging from about 0.3 to 80, preferably 0.3 to 60 percent by weight based upon the total weight of the final polymer produced. In these processes employing an inert particulate material (e.g., carbon black) it is permissible to utilize a catalyst support such as carbon black.

All references cited herein are incorporated by reference.

The following examples further illustrate aspects of the invention. All percentages in the specification are by weight unless otherwise specified.

EXAMPLES

Measurements and Glossary $^1$H NMR spectra were measured by a Bruker AMX 300 spectrophotometer using toluene-d$_8$ as internal standard.

Activity was measured in grams polyethylene/mmol metal-hr-100 psi ethylene.

PDI is the Polydispersity Index, which is equivalent to Molecular Weight Distribution (Mw/Mn, where Mw is weight average molecular weight and Mn is number average molecular weight), as determined by gel permeation chromatography using crosslinked polystyrene columns; pore size sequence: 1 column less than 1000 A, 3 columns of mixed 5×10$^7$ A; 1,2,4-trichlorobenzene solvent at 1400° C. with refractive index detection.

Density in g/ml was determined in accordance with ASTM 1505, based on ASTM D-1928, procedure C., plaque preparation. Plaques were made conditioned for one hour at 100° C. to approach equilibrium crystallinity, measurement was then made in a density gradient column.

BuCpZ is bis(n-butylcyclopentadienyl)zirconium dichloride, available from Albemarle Corporation.

MAO is methylaluminoxane in toluene, available from Albemarle Corporation.

MMAO is modified methylaluminoxane in heptane, available from Akzo Corporation.

Shorthand designations for phenol compounds employed in Table 1 are defined as follows:

| Designation | Definition |
|---|---|
| 2,6-DMP | 2,6-Dimethoxyphenol |
| 2,3-DMP | 2,3-Dimethoxyphenol |
| 3,5-DMP | 3,5-Dimethoxyphenol |
| 2,6-DMeP | 2,6-Dimethylphenol |
| 2,6-DCP | 2,6-Dichlorophenol |

All phenol compounds are available from Aldrich Chemical Company.

1. Catalyst Preparation.

Preparation of Bis(n-butylcyclopentadienyl) zirconium bis(2,6-dimethoxyphenoxide) [BuCpZOP-2,6-OMe1].

To a solution of $(n\text{-BuCp})_2\text{ZrCl}_2$ (0.500 g, 1.237 mmol) and 2,6-dimethoxyphenol (0.398 g, 2.584 mmol) in toluene (30 ml) was added triethylamine (0.726 g, 7.175 mmol) at room temperature with stirring. A precipitate formed immediately which was removed by filtration. The title compound could then be recovered in about 85% yield by removal of the toluene solvent under vacuum with mild heating. $^1$H NMR: d 6.70–6.48 (m, phenyl, 6H), 6.11 (m, cyclopentadienyl, 4H), 6.07 (m, cyclopentadienyl, 4H), 3.54 (s, $OCH_3$, 12H), 2.50 (t, J=7.6 Hz, $CH_2$, 4H), 1.42 (m, $CH_2$, 4H), 1.18(m, $CH_2$, 4H), 0.79(t, J=7.2 Hz, $CH_3$, 6H).

Preparation of Bis(n-butylcyclopentadienyl) zirconium bis(phenoxide) [BuCpZOP]

The title compound was prepared in 80% yield in accordance with the above procedure by reacting (n-BuCp)$_2$ZrCl$_2$, phenol, and triethylamine. $^1$H NMR: d 7.21–6.76 (m, phenyl, 10H), 5.90 (m, cyclopentadienyl, 8H), 2.38 (t, J=7.8 Hz, $CH_2$, 4H), 1.35 (m, $CH_2$, 4H), 1.16 (m, $CH_2$, 4H), 0.79 (t, J=7.2 Hz, $CH_3$, $_6$H).

Preparation of Bis(n-butylcyclopentadienyl) zirconium bis(3,5-dimethoxyphenoxide) [BuCpZOP-3,5-OMe]

The title compound was synthesized in 85% yield following the above procedure by reacting (n-BuCp)$_2$ZrCl2,3,5-dimethyoxyphenol, and triethylamine. $^1$H NMR: d 6.16 (s, phenyl, 6H), 5.95 (s, cyclopentadienyl, 8H), 3.47 (s, $OCH_3$, 12H), 2.45 (t, J=7.6 Hz, $CH_2$, 4H), 1.38 (m, $CH_2$, 4H), 1.19 (m, $CH_2$, 4H), 0.80 (t, J=7.2 Hz, $CH_3$, 6H).

Preparation of Bis(n-butylcyclopentadienyl) zirconium bis(4-methoxyphenoxide) [BuCpZOP-4-OMe]

The title compound was prepared in about 80% yield using the above procedure by reacting (BuCp)$_2$ZrCl2,4-methyoxyphenol, and triethylamine. $^1$H NMR: d 6.82–6.79 (m, phenyl,4H), 6.74–6.68 (m, phenyl, 4H), 5.96–5.92 (m, cyclopentadienyl, 8H), 3.42 (s, OCH3,6H), 2.44 (t, J=7.6 Hz, $CH_2$, 4H), 1.40 (m, $CH_2$, 4H), 1.20 (m, $CH_2$, 4H), 0.82 (t, J=7.2 Hz, $CH_3$, 6H).

Preparation of Bis(n-butylcyclopentadienyl) zirconium bis(4-methoxyphenoxide) [BuCpZOP-4-OMe]

The title compound, by using the above procedure, was synthesized in 80% yield from (n-BuCp)$_2$ZrCl2,2-methyoxyphenol, and triethylamine. $^1$H NMR: d 6.94–6.67 (m, phenyl,8H), 6.01 (m, cyclopentadienyl, 8H), 3.50 (s, $OCH_3$, 6H), 2.46 (t, J=7.6 Hz, $CH_2$, 4H), 1.38 (m, $CH_2$, 4H), 1.17 (m, $CH_2$, 4H), 0.78 (t, J=7.2 Hz, $CH_3$, 6H).

II. Polymerization Process Using the Catalysts of the Invention

Examples 1–8

In each of Examples 1–8, polyethylene was produced in a slurry phase reactor using a metallocene compound (Component A or A') specified in Table 1, methylaluminoxane (MAO) or modified methylaluminoxane (MMAO) as an activating cocatalyst, and/or a phenol compound (Component C) as external molecular weight modifier.

For each of Examples 1–8, a solution of metallocene catalyst (Component A or A') in toluene was prepared. An aliquot of this solution was added to a 6 ounce bottle containing 100 ml of hexane and a measured amount of MAO. When Component A was used, an aliquot of phenol compound (Component C), molecular weight modifier, in toluene was also added to the mixing bottle. Hexene-1 was then added to the pre-mixed catalyst composition. Anhydrous conditions were maintained. The polymerization time for all the Examples 1 and 3–8 was 30 minutes. The polymerization time in Example 2 was 45 minutes. Table 1 below shows the catalyst composition makeup for Example 1–8.

The slurry reactor was a 1 liter, stainless steel autoclave equipped with a mechanical agitator. The reactor was first dried by heating at 96° C. under a stream of dry nitrogen for 40 minutes. After cooling the reactor to 50° C., 500 ml of hexane was added to the reactor, and the reactor components were stirred under a gentle flow of nitrogen. The pre-mixed catalyst composition was then transferred to the reactor under a stream of nitrogen and the reactor was sealed. The temperature of the reactor was gradually raised to 75° C. and the reactor was pressured to 150 psi with ethylene. Heating was continued until a polymerization temperature of 85° C. was attained. Unless otherwise noted, polymerization was continued for 30 minutes, during which time ethylene was continually added to the reactor to maintain a constant pressure. At the end of 30 minutes, the reactor was vented and opened.

Table 1 gives the activity, the molecular weights (Mw and Mn), the molecular weight distributions (Mw/Mn, also known as PDI), and densities of various polyethylene made in Examples 1–8. As shown in Table 1, the polyethylene produced exhibited relatively high molecular weight.

Comparative Examples C1–C11

In Examples C1–C11, polyethylene was produced under conditions similar to those of Examples 1–8 with the exception that Component A' and/or Component C. were not used. The polymerization time for Examples C1 and C3–C11 was 30 minutes; while for C2, the polymerization time was 45 minutes.

As shown in Table 1, when Component C. was not included in the catalyst system of the polymerization, the polymers produced all had relatively low molecular weights. For example, a comparison of Examples 1 and C1 showed that the molecular weight (Mw) of polymers produced when Component C. was present was 103,855; but the Mw was only 37,745 in the absence of Component C. A comparison of Examples 2 and C2 demonstrated that the inclusion of Component C. has not only produced polymers with higher molecular weight but also had enhanced catalyst activity when longer polymerization time was employed. A comparison of Example 1 with Examples C3 and C4 showed that the inclusion of phenol compound of the same functional group placed at different positions on the ring (versus Component C. (positions 2 and 6) of Example 1) were not effective in producing polymers with high molecular weights. A comparison between Example 1 and Examples C5 and C6 showed that the inclusion of phenol compounds with substitution groups at the same positions on the benzene ring but with different functionality from Component C. were not effective in producing polymers with high molecular weights. Comparative Example C7 showed that simple phenol was not effective in producing polymers with high molecular weights.

Table 1 also showed that the employment of the catalyst systems of the invention (Component A') consistently produced polymers with higher molecular weights than those produced by formulations other than this invention. This can be seen by comparing Examples 5–8 with Examples C8–C11.

TABLE 1

| Example | Catalyst | Phenol Compound | Phenol/Zr | Cocatalyst | Al(MAO)/Zr | Activity | Mw | Mn | PDI | Density |
|---|---|---|---|---|---|---|---|---|---|---|
| 1 | BuCpZ | 2,6-DMP | 2 | MAO | 1500 | 69995 | 103855 | 43273 | 2.4 | 0.9316 |
| 2 | BuCpZ | 2,6-DMP | 2 | MAO | 1500 | 89423 | 111276 | 35895 | 3.1 | 0.9304 |
| 3 | BuCpZ | 2,6-DMP | 6 | MAO | 1500 | 50867 | 133099 | 29577 | 4.5 | 0.9352 |
| 4 | BuCpZ | 2,6-DMP | 2 | MAO | 200 | 65313 | 143915 | 57065 | 2.5 | nd* |
| C1 | BuCpZ | — | 0 | MAO | 1500 | 68060 | 37745 | 17254 | 2.2 | nd |
| C2 | BuCpZ | — | 0 | MAO | 1500 | 63251 | 39634 | 16514 | 2.4 | 0.9306 |
| C3 | BuCpZ | 2,3-DMP | 2 | MAO | 1500 | 71238 | 44507 | 20409 | 2.2 | nd |
| C4 | BuCpZ | 3,5-DMP | 2 | MAO | 1500 | 76080 | 41795 | 13932 | 3 | 0.9316 |
| C5 | BuCpZ | 2,6-DMeP | 2 | MAO | 1500 | 70977 | 38440 | 17212 | 2.2 | 0.9321 |
| C6 | BuCpZ | 2,6-DCP | 2 | MAO | 1500 | 67619 | 41894 | 18255 | 2.3 | 0.9311 |
| C7 | BuCpZ | Phenol | 2 | MAO | 1500 | 69785 | 43206 | 12344 | 3.5 | nd |
| 5 | BuCpZOP-2,6-OMe | — | — | MAO | 1500 | 68221 | 97244 | 34730 | 2.8 | 0.9321 |
| 6 | BuCpZOP-2,6-OMe | — | — | MAO | 200 | 43258 | 176512 | 63040 | 2.8 | 0.9238 |
| 7 | BuCpZOP-2,6-OMe | — | — | MMAO | 1500 | 54957 | 116198 | 44692 | 2.6 | 0.9306 |
| 8 | BuCpZOP-2,6-OMe | — | — | MMAO | 200 | 49333 | 163747 | 54582 | 3 | 0.9265 |
| C8 | BuCpZOP-3,5-Ome | — | — | MAO | 1500 | 72401 | 44733 | 15425 | 2.9 | 0.9331 |
| C9 | BuCpZOP-4-OMe | — | — | MAO | 1500 | 71599 | 40284 | 15494 | 2.6 | 0.9337 |
| C10 | BuCpZOP-2-OMe | — | — | MAO | 1500 | 70496 | 35676 | 14865 | 2.4 | 0.9327 |
| C11 | BuCpZOP | — | — | MAO | 1500 | 86496 | 31296 | 10791 | 2.9 | nd |

*nd = not determined.

What is claimed is:

1. A process for producing a polyolefin which comprises contacting at least one olefin and optionally a diene in a polymerization vessel under polymerization conditions with a catalyst composition comprising:

A) a metal complex having the structure $(CpR_n)R^1_{(1-y)}(CpR_m)MX_2$ wherein, M is a metal selected from the group consisting of Ti, Zr, and Hf;

each $(CpR_n)$ and $(CpR_m)$ is independently a cyclopentadienyl or R-substituted cyclopentadienyl group bonded to M, wherein R independently each occurrence is selected from the group consisting of allyl, cycloalkyl, alkenyl, cycloalkenyl, aryl, alkylaryl, and arylalkyl, said R containing from 1 to 20 carbon atoms, and optionally at least two R moieties on a R-substituted Cp group are joined together to form a ring having 4 to 6 carbon atoms;

$R^1$ is selected from the group consisting of (i) $C_1$–$C_4$ substituted or unsubstituted alkenyl radicals, (ii) dialkyl or diaryl substituted germanium or silicon radicals, (iii) alkyl or aryl phosphines, and (iv) amino groups, said $R^1$ bridging the $(CpR_n)$ and $(CpR_m)$ rings;

each X is independently selected from the group consisting of (i) hydride, (ii) $C_1$–$C_{20}$ alkyl, (iii) $C_1$–$C_{20}$ aryl, (iv) $C_1$–$C_{20}$ alkenyl, (v) $C_1$–$C_{20}$ alkylaryl, (vi) $C_1$–$C_{20}$ arylalkyl, (vii) $C_1$–$C_0$ hydrocarboxy, (viii) $C_1$–$C_{20}$ aminoalkyl, and (ix) halide;

n and m are each 0, 1, 2, 3,4, or 5; and y is 0, or 1;

B) an aluminoxane; and

C) a phenol having the formula:

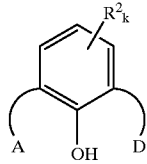

wherein:

A and D are the same or different and are selected from the group consisting of: —OR', —NR'$_2$, —PR'$_2$, —CR'$_2$OR', —CR'$_2$NR'$_2$, —COR', —COOR', —CONR'$_2$, —OCOR' and —NR'COR', wherein each R' is independently selected from the group consisting of alkyl, cycloalkyl, alkenyl, cycloalkenyl, aryl, alkylaryl, and arylalkyl, each R' containing from 1 to 20 carbon atoms;

$R^2$ is independently selected from the group consisting of alkyl, cycloalkyl, alkenyl, cycloalkenyl, aryl, alkylaryl, and arylalkyl, each $R^2$ containing from 1 to 20 carbon atoms; and optionally at least two $R^2$ moieties are joined together to from a ring having 4 to 6 carbon atoms; and k is 0, 1, 2, 3.

2. The process of claim 1 wherein the polymerization is conducted in a gas phase fluidized bed reactor.

3. The process of claim 1 wherein component A) is selected from the group consisting of bis(cyclopentadienyl) zirconium dichloride, bis(n-butylcyclopentadienyl)-zirconium dichloride, bis(n-propylcyclopentadienyl) zirconium dichloride, bis(methylcyclopenta-dienyl) zirconium dichloride, bis(1-indenyl)zirconium dichloride, bis( 1,3-methyl-n-butylcyclopentadienyl)zirconium dichloride, bis(1,3-methyl-n-propylcyclopentadienyl) zirconium dichloride, dimethylsilyl bis(cyclopentadienyl) zirconium dichloride, dimethylsilyl bis(3-n-propylcyclopentadienyl)zirconium dichoride, rac-ethylenebis (indenyl)zirconium dichloride, rac-ethylenebis (4,5,6,7-H -tetrahydroindenyl)zirconium dichloride, and mixtures thereof.

4. The process of claim 1 wherein component C) is selected from the group consisting of 2,6-dimethoxyphenol, 2,6-diethoxyphenol, 2,6-di(n-propoxy)phenol, 2,6-di(iso-propoxy)phenol, 2,6di(n-butoxy)phenol, 2,6-di(t-butoxy) phenol, 2,6-diaminophenol, 2,6-diacetylphenol, 2,6-diformylphenol, 2,6-di(methylimino)phenol, 2,6-di (phenylimino)phenol, 2,6-di(methoxymethyl)phenols, 2,6-di(ethoxymethyl)phenols, 2,6-di(methylcarboxylate)phenol, 2,6-methoxy(acetyl)phenol, 2,6-methoxy(formyl)phenol, 2,6-ethoxy(formyl)phenol, and mixtures thereof.

5. A process for producing a polyolefin which comprises contacting at least one olefin and optionally a diene in a polymerization vessel under polymerization conditions with a catalyst composition comprising:

A') a metal complex having the structure $(CpR_n)R^1_{(1-y)}(CpR_m)MY_2$ wherein, M is a metal selected from the group consisting of Ti, Zr, and Hf;

each $(CpR_n)$ and $(CpR_m)$ is independently a cyclopentadienyl or R-substituted cyclopentadienyl group bonded to M, wherein R independently each occurrence is selected from the group consisting of alkyl, cycloalkyl, alkenyl, cycloalkenyl, aryl, alkylaryl, and arylalkyl, said R containing from 1 to 20 carbon atoms, and optionally at least two R moieties on a R-substituted Cp group are joined together to form a ring having 4 to 6 carbon atoms;

$R^1$ is selected from the group consisting of (i)$C_1$–$C_4$ substituted or unsubstituted alkenyl radicals, (ii) dialkyl or diaryl substituted germanium or silicon radicals, (iii) alkyl or aryl phosphines, and (iv) amino groups, said $R^1$ bridging the $(CpR_n)$ and $(CpR_m)$ rings;

each X is independently selected from the group consisting of (i) hydride, (ii) $C_1$–$C_{20}$ alkyl, (iii) $C_1$–$C_{20}$ aryl, (iv) $C_1$–$C_{20}$ alkenyl, (v) $C_1$–$C_{20}$ alkylaryl, (vi) $C_1$–$C_{20}$ arylalkyl, (vii) $C_1$–$C_{20}$ hydrocarboxy, (vii) $C_1$–$C_{20}$ aminoalkyl, and (ix) halide;

n and m are each 0, 1,2, 3, 4, or 5;

y is 0, or 1; and each Y is independently a phenoxide radical having the formula:

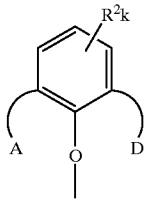

wherein:

A and D are the same or different and are selected from the group consisting of: —OR', —NR'$_2$, —PR'$_2$, —CR'$_2$OR', —CR'$_2$, NR'$_2$, —COR', —COOR', —CONR'$_2$, —OCOR' and —NR'COR', wherein each R' is independently selected from the group consisting of alkyl cycloalkyl, alkenyl, cycloalkenyl, aryl, alkylaryl, and arylalkyl, each R' containing from 1 to 20 carbon atoms;

$R^2$ is independently selected from the group consisting of alkyl, cycloalkyl, alkenyl, cycloalkenyl, aryl, alkylaryl, and arylalkyl, each $R^2$ containing from 1 to 20 carbon atoms; and optionally at least two $R^2$ moieties are joined together to from a ring having 4 to 6 carbon atoms; and k is 0, 1, 2, 3; and B') an aluminoxane.

6. The process of claim 5 wherein the polymerization is conducted in gas phase fluidized bed reactor.

7. The process of claim 5 wherein component A') is selected from the group consisting of bis(cyclopentadienyl) zirconium dichloride, bis(n-butylcyclopentadienyl)-zirconium dichloride, bis(n-propylcyclopentadienyl) zirconium dichloride, bis(methylcyclopenta-dienyl) zirconium dichloride, bis(1-indenyl)zirconium dichloride, bis(1,3-methyl-n-butylcyclopentadienyl)zirconium dichloride, bis(1,3-methyl-n-propycyclopentadienyl) zirconium dichloride, dimethylsilyl bis(cyclopentadienyl) zirconium dichloride, dimethylsilyl bis(3-n-propylcyclopentadienyl)zirconium dichloride, rac-ethylenebis(indenyl)zirconium dichloride, rac-ethylenebis (4,5,6,7-H-tetrahydroindenyl)zirconium dichloride, and mixtures thereof.

* * * * *